United States Patent [19]
Piet

[11] 4,337,807
[45] Jul. 6, 1982

[54] HIGH PRESSURE COUPLING

[76] Inventor: Meyer Piet, 15430 Proctor Ave., City of Industry, Calif. 91747

[21] Appl. No.: 238,761

[22] Filed: Feb. 27, 1981

Related U.S. Application Data

[63] Continuation of Ser. No. 62,341, Jul. 31, 1979, abandoned.

[51] Int. Cl.³ .......................... B65B 3/04; F16K 3/12
[52] U.S. Cl. .................................. 141/383; 141/392; 251/333
[58] Field of Search ............ 141/346, 311 R, 383–386, 141/392; 251/333

[56] References Cited
U.S. PATENT DOCUMENTS 2,822,789  2/1958  Phillips .......................... 251/333 X Primary Examiner—Frederick R. Schmidt
Attorney, Agent, or Firm—James E. Brunton

[57] ABSTRACT

A high pressure coupling valve for operably interconnecting a source of gas under high pressure with a high pressure gas system. The device comprises a hollow valve body adapted to be connected to the high pressure system and has at one end an elongated frusto-conically shaped valve seat. A valve stem adapted to be connected to the source of high pressure gas is provided with a gas flow passage and includes an elongated frusto-conically shaped valve face. The valve stem is reciprocally carried within the valve body and mechanical actuating means are provided to move the valve stem relative to the valve body to bring the valve face into positive sealing engagement with the valve seat. The unique design of the valve seat, the valve face and the actuating means permits the device to be repeatedly opened and closed without any cutting, mechanical abrasion or other degradation of either the valve seat or valve face. The device can be opened and closed with a minimum of applied force and can be repeatedly used with absolute safety and reliability.

3 Claims, 5 Drawing Figures

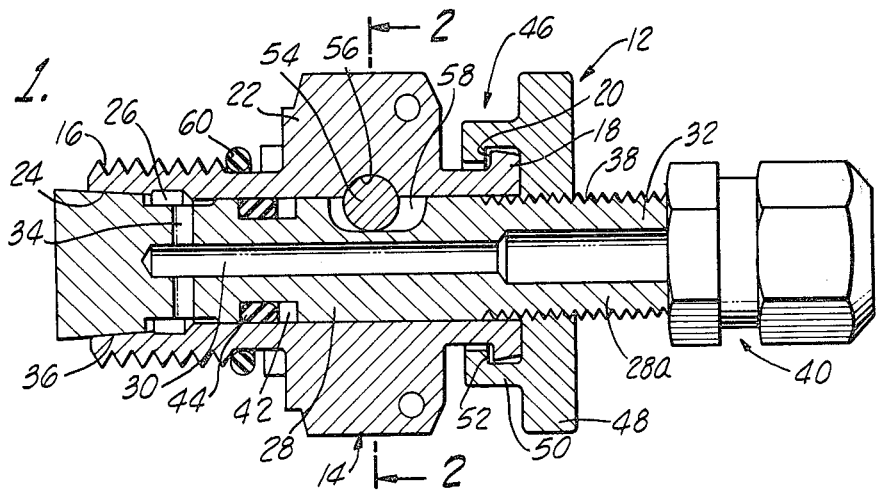
FIG. 1.
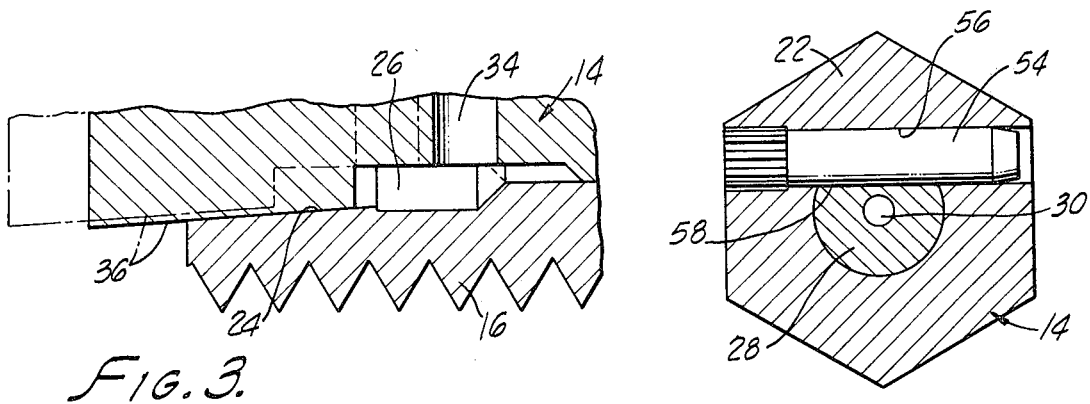
FIG. 3.
FIG. 2.
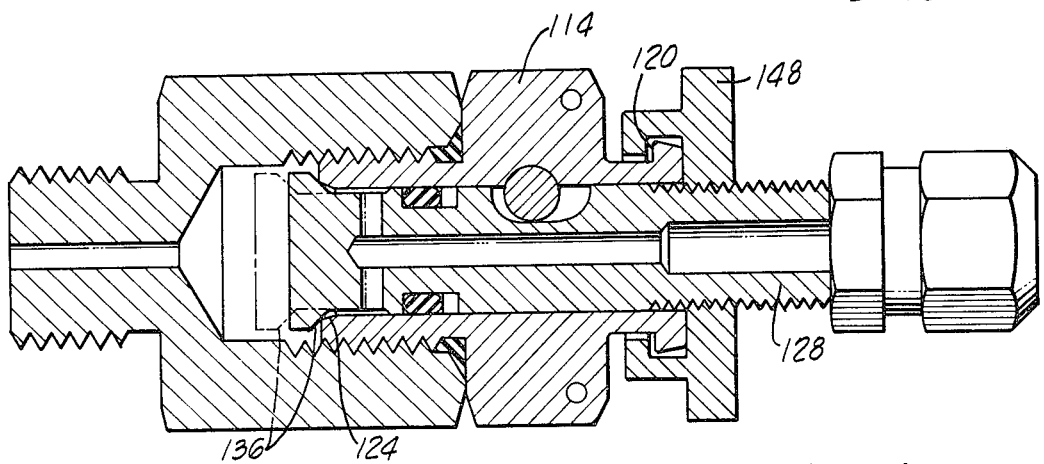
FIG. 4.
(PRIOR ART)
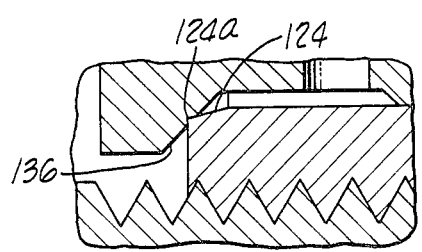
FIG. 5.
(PRIOR ART)

HIGH PRESSURE COUPLING

This is a continuation of application Ser. No. 062,341 filed July 31, 1979, now abandoned.

BACKGROUND OF THE INVENTION

1. Field of the Invention

The present invention relates generally to high pressure valves and more particularly to a positive acting, highly reliable high pressure fill and vent valve for use in filling pressure vessels.

2. Discussion of the Prior Art

A very difficult problem faced by designers of high pressure gas handling equipment has been the design of simple, yet extremely safe and highly reliable high pressure valve couplings for use in filling and venting high pressure gas systems such as pressure vessels. Of particular concern in the design of such devices has been the design of valve components which will enable the valve to be repeatedly opened and closed under high pressures ranging in thousands of pounds per square inch without the necessity of applying excessive operating forces and without experiencing leaking and other valve malfunctions.

Prior art fill and vent valves for high pressure applications have traditionally embodied valve seats and valve faces having the configuration illustrated in FIGS. 4 and 5 of the drawings. As best seen in FIG. 5, effective sealing is achieved in these types of valves by causing the valve seat to actually "bite into" the valve face along a single line of contact as the valve stem is mechanically drawn into a seating position. While such an arrangement usually provides a reasonable effective high pressure gas seal the first few times the device is opened and closed, it has significant drawbacks after multiple cycling. This is because even the first time the valve is closed damage is caused to the valve face due to the cutting or scoring action of the valve seat. Upon each subsequent closing of the valve, the damage is aggrevated making the valve potentially unsafe.

The significant drawbacks of the prior art high pressure coupling devices are eliminated in the device of the present invention. By providing a unique elongated tapered "surface to surface" seal, damage to the valve seat and valve face is completely avoided. Therefore, the device of the present invention can be used repeatedly with absolute reliability and safety. Due to the novel conically shaped mating surfaces of the valve, wear is automatically compensated for and effective sealing, even under very high pressures, is assured.

SUMMARY OF THE INVENTION

An object of the present invention is to provide a safe and highly reliable mechanically actuated, high pressure coupling of simple deisgn which can be readily interconnected between a source of high pressure gas and a high pressure gas system for use in repeatedly pressurizing and venting the system.

It is another object of the invention to provide a coupling of the aforementioned character which embodies a valve seat and a cooperating valve face of unique design which when mechanically brought into mating juxtaposition will positively seal under high pressure conditions even after multiple openings and closings of the valve.

It is another object of the invention to provide a valve configuration as described in the previous paragraph in which neither the valve seat nor the valve face is cut or mechanically abraded upon closing of the valve.

It is still another object of the invention to provide a coupling of the character described in which the valve face is adapted to cooperate with the valve seat when seated thereagainst to provide a long frusto-conically shaped sealing surface which provides a positive sealing action without causing mechanical damage to either valve component.

It is another object of the invention to provide a precision coupling valve device designed for opening and closing with a minimum of applied force.

In summary, these and other objects of the invention are realized by a high pressure valve for operably interconnecting a source of high pressure gas with the inlet of a high pressure system comprising a valve body having a longitudinal bore extending therethrough, said bore terminating proximate a first end of said body in an elongated, tapered valve seat, said valve body including a first connector means for removably connecting said valve body with the high pressure system and a gas flow passageway disposed proximate said tapered valve seat; a valve stem carried within said bore of said valve body for reciprocal movement with respect thereto, said valve stem being provided with a gas flow passageway having an inlet and an outlet, said outlet being adapted to communicate with said gas flow passageway of said valve body, said valve stem further including an elongated valve face disposed at a first end thereof having side walls tapering at the same angle as said valve seat and adapted to cooperate therewith when sealed thereagainst to provide a long frustoconically shaped sealing surface; and a second connector means for removably interconnecting said inlet of said valve stem with the source of high pressure gas; and a valve actuating means for urging longtitudinal movement of said valve stem within said longitudinal bore of said valve body to move said elongated valve face into sealing engagement with said elongated valve seat.

BRIEF DESCRIPTION OF THE DRAWINGS

FIG. 1 is a longitudinal section of the High Pressure Coupling of the present invention.

FIG. 2 is a cross-sectional view taken along lines 2—2 of FIG. 1.

FIG. 3 is a greatly enlarged, fragmentary cross-sectional view illustrating the appearance of the valve seat and valve face when the valve is in an opened and closed position. The phantom lines show the valve stem in an extended, open position while the solid lines show the valve stem in a retracted, closed position.

FIG. 4 is a longitudinal sectioned view illustrating the construction of the typical prior art high pressure coupling valve.

FIG. 5 is a greatly enlarged fragmentary view showing the configuration of the valve seat and valve face in the closed position, and illustrating the penetration of the sharp edge of the valve face into the valve seat when the valve is in a closed position.

DESCRIPTION OF ONE FORM OF THE INVENTION

Referring to the drawings and particularly to FIG. 1, there is shown one form of the high pressure valve coupling of the present invention. The coupling assemblage, generally designated by the numeral 12, includes a valve body 14 having a central bore therethrough which is generally circular in cross-section at any point.

Body 14 comprises a threaded shank portion 16 at a first end thereof and an enlarged diameter collar 18 at the second end thereof, the inboard surface of which defines a radially outwardly extending locking shoulder 20. Disposed intermediate said first and second ends of the valve body is an enlarged diameter central portion 22. An important feature of the invention is the elongated frusto-conically shaped valve seat 24 which is formed proximate the first end of body 14. At the inlet end of the coupling there is provided means for removably connecting the device to a source of high pressure fluid. An annular shaped fluid flow passageway 26, the purpose of which will presently be discussed, is located proximate the outlet end of the coupling and adjacent the valve seat 24.

Reciprocally carried within the central bore of valve body 14 is a valve stem 28. The valve stem is provided with a fluid flow passageway 30 having an inlet 22 adapted to communicate with a source of high pressure fluid, such as high pressure gas, and an outlet 34 adapted to communicate with annular shaped passageway 26. In the embodiment of the invention shown in the drawings, passageway 30 is provided in the form of a central bore extending longitudinally of the valve stem. As depicted in FIG. 1, the inlet end 32 of the passageway 30 is preferably of slightly enlarged diameter. Outlet 34 is disposed proximate the left end of passageway 30 as viewed in FIG. 1 and comprises at least one radially outwardly extending bore, or passageway, positioned so as to communicate with the annular passageway 26 formed in valve body 14.

Located proximate the first, or left, end of valve stem 28 is an elongated valve face 36 having side walls tapering at the same angle as valve seat 24 formed in body 14. As best seen in FIG. 3 face 36 is adapted to cooperate with seat 24 when seated thereagainst to provide a long frusto-conically shaped positive sealing surface.

Proximate the second, or right, end 28a of the valve stem as viewed in FIG. 1, there is provided a threaded portion 38 adapted to permit the assemblage to be threadably connected with a source of high pressure gas such as a gas bottle or the like. Internally threaded fittings for this purpose are generally designated by the numeral 40 in FIG. 1.

Formed intermediate the ends of valve stem 28 and rearwardly of outlet passageway 34 is a longitudinally elongated "O" ring groove 42. Carried within groove 42 is a resiliently deformable "O" ring 44 adapted to sealably engage the walls of the central bore formed through the valve body to prevent the passage of gasses between the valve stem and the valve body upon reciprocal movement of the valve stem within body 14.

The numeral 46 in FIG. 1 generally designates a valve actuating means for urging longitudinal movement of valve stem 28 within the central bore of the valve body 14 to move the elongated valve face 36 into sealing engagement with elongated valve seat 24. In the embodiment of the invention shown in the drawings, the valve actuating means comprises an internally threaded ring 48 rotatably carried by the valve body intermediate central portion 22 and locking shoulder 20 formed on collar 18. Ring 48 is disposed in threadable engagement with threads 38 formed on the valve stem and is provided with an inturned flange means 50 having a radially extending shoulder 52 adapted to pressurally engage shoulder 20. In a manner presently to be described, rotation of ring 48 relative to body 14 will cause controllable reciprocal movement of valve stem 28 within the central bore of the valve body.

To prevent relative rotation between valve body 14 and valve stem 28 upon rotation of ring 48, there is provided a locking means in the form of a locking pin 54. As best seen by also referring of FIG. 2, the upper portion of locking pin 54 is closely receivable within a transversly extending channel 56 formed in the upper half of the central portion 22 of the valve body. The lower portion of pin 54 is receivable within a transversly extending channel 58 formed in valve stem 28. Channel 58 is constructed to provide longitudinal clearance to pin 34 to permit limited longitudinal movement of stem 28 relative to body 14.

OPERATION

In the embodiment of the invention shown in the drawings, threaded shank portion 16 of the valve body comprises the means for removably interconnecting the coupling to a high pressure gas system as, for example, a pressure vessel. Similarly, fittings 40, in cooperation with threads 38, comprise the means for removably interconnecting the coupling to a source of gas under high pressure as, for example, a high pressure gas bottle.

With the components of the device in the closed position shown in FIG. 1 and with the device suitably interconnected between a source of high pressure gas and a high pressure system, it will be observed that no gas will flow into the high pressure system due to the fact that the valve face of the valve stem is in positive sealable engagement with the valve seat of the body. To move the valve stem into the open position as shown by the phantom lines in FIG. 3, ring 48 is rotated in a counter-clock wise direction relative to the body portion 14. This will cause movement of the valve stem from the position shown in the solid lines in FIG. 3 to the position shown by the phantom lines in FIG. 3. In this open position gas will flow through inlet passageway 32 through outlet passageway 34 into annular passageway 26 and thence into the high pressure gas system through the space between the valve face and the valve seat. Flow of gas rearwardly of the coupling between the outer surface of the valve stem and the inner surface of the central bore formed in the valve body is prevented by "O" ring 44. Similarly, any possible leakage between the threaded portion 16 of the valve body and the high pressure system to which the device is connected is prevented by the resiliently deformable "O" ring 60 (FIG. 1).

To close the coupling valve and prevent further flow of gas under high pressure from the gas source into the high pressure system, ring 48 is rotated in a clockwise position. Rotation of ring 48 will bring shoulders 52 and 20 into pressurial engagement and will cause movement of the valve stem to the left as viewed in FIG. 1. Such movement will cause the elongated frusto-conically shaped valve face 36 to move into positive sealable engagement with the similarly configured valve seat 24. Because of the unique configuration of the valve face and valve seat, as the valve face moves into sealable engagement with the valve seat no cutting, mechanical abrasion or other degredation of either the valve seat or the valve face will result. Accordingly the coupling valve may be opened and closed repeatedly with absolute safety and reliability.

Referring to FIGS. 4 and 5 of the drawings, the coupling valve of the prior art depicted therein is of somewhat similar construction to the device of the present invention and is operated in a somewhat similar manner. For example, the prior art device has a valve body 114 and a valve stem 128 reciprocally carried within a central bore formed in the valve body. In operation of the device, rotation of ring 148 with respect to valve body 114, will cause the valve stem 128 to move reciprocally within a central bore formed in the valve body. However, as best seen in FIG. 5, both the valve seat and valve face of the prior art device are configured quite differently from those of the device of the present invention. In the prior art device, the valve seat, designated by the numeral 124, is provided with a sharp leading edge 124a and the valve face 136 formed on stem 128 tapers inwardly at a rather steep angle. With this construction, when the valve stem is brought into the closing position shown in FIG. 5, it is necessary that leading edge 124a actually cut into face 136 a substantial distance to provide the seal necessary to accommodate high pressure gases normally encountered in the use of this type of coupling. As earlier mentioned, while this type of seal is generally effective the first time the device is used, subsequent opening and closing of the valve can produce a hazardous result because of the damage inflicted upon the valve face by the sharp edge of the valve seat each time the valve is closed. This damage to the valve face can cause serious leakage and hazardous malfunction of the device in service. The coupling of the present invention, as previously described herein, overcomes this significant drawback of the prior art high pressure couplings by providing the unique elongated conically shaped sealing surface which is not susceptable to damage by repeated opening and closing of the valve.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A high pressure valve for operably interconnecting a source of high pressure gas with the inlet of a high pressure system said valve being of the type used in high pressure gas applications involving pressures of between 5000 and 25,000 pounds per square inch and comprising:
    (a) a valve body having a longitudinal bore extending therethrough, said bore terminating proximate a first end of said body in an elongated, tapered valve seat, said valve body including:
        (1) first connector means for removably connecting said valve body with the high pressure system;
        (2) a gas flow passageway disposed proximate said tapered valve seat; and
        (3) a radially outwardly extending locking shoulder;
    (b) a valve stem carried within said bore of said valve body for reciprocal movement with respect thereto, said valve stem being provided with a gas flow passageway having a inlet and an outlet, said outlet being adapted to communicate with said gas flow passageway of said valve body, said valve stem further including:
        (1) an elongated valve face disposed at a first end thereof having side walls tapering at the same angle as said valve seat and adapted to cooperate therewith when seated thereagainst to provide a long frustoconically shaped sealing surface;
        (2) second connector means for removably interconnecting said inlet valve stem with the source of high pressure gas; and
        (3) external threads provided proximate the second end thereof for threadably receiving said second connector means; and
    (c) valve actuating means for urging longitudinal movement of said valve stem within said longitudinal bore of said valve body to move said elongated valve face into sealing engagement with said elongated valve seat said means comprising an internally threaded ring rotatably carried by said valve body in threadable engagement with said threaded valve stem, said ring being provided with an inturned flange means adapted to pressurally engage said locking shoulder of said body as said ring is rotated relative to said valve body and further including means for preventing relative rotation between said valve body and said valve stem whereby as said ring is rotated relative to said body, said valve stem will be moved within said longitudinal bore to bring said valve face into sealable engagement with said valve seat.

2. A high pressure valve as defined in claim 1 in which said means for preventing relative rotation between said valve body and said valve stem comprises a transversely extending locking pin extending through transverse bores formed in said valve body and said valve stem.

3. A high pressure valve as defined in claim 1 in which said gas flow passageway formed in said valve stem comprises a first longitudinally extending portion in communication with at least one radially extending portion adapted to communicate with said annular shaped passageway in said valve body.

* * * * *